US006775049B1

(12) United States Patent
So

(10) Patent No.: US 6,775,049 B1
(45) Date of Patent: Aug. 10, 2004

(54) OPTICAL DIGITAL SIGNAL PROCESSING SYSTEM AND METHOD

(75) Inventor: John Ling Wing So, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 62 days.

(21) Appl. No.: 10/348,566

(22) Filed: Jan. 20, 2003

(51) Int. Cl.[7] ............................................. G02B 26/00

(52) U.S. Cl. ........................................ 359/291; 345/690

(58) Field of Search ................................. 359/291, 292, 359/298, 224; 345/84, 690, 691, 692

(56) References Cited

U.S. PATENT DOCUMENTS 6,654,157 B2 * 11/2003 Islam et al. ................. 359/291

* cited by examiner

Primary Examiner—Hung Xuan Dang
Assistant Examiner—Tuyen Tra
(74) Attorney, Agent, or Firm—Robert D. Marshall, Jr.; W. James Brady, III; Frederick J. Telecky, Jr.

(57) ABSTRACT

A method for optical digital signal processing, comprises configuring a plurality of binary mirrors to allow a subset of the binary mirrors to represent a range of values. The plurality of binary mirrors comprise a digital micromirror device. Light from a light source is received at the digital micromirror device. The intensity of the light is altered to represent one of the values based, at least in part, on the configuration of the subset of the binary mirrors. The altered light is transmitted from the digital micromirror device to a detector array.

41 Claims, 7 Drawing Sheets

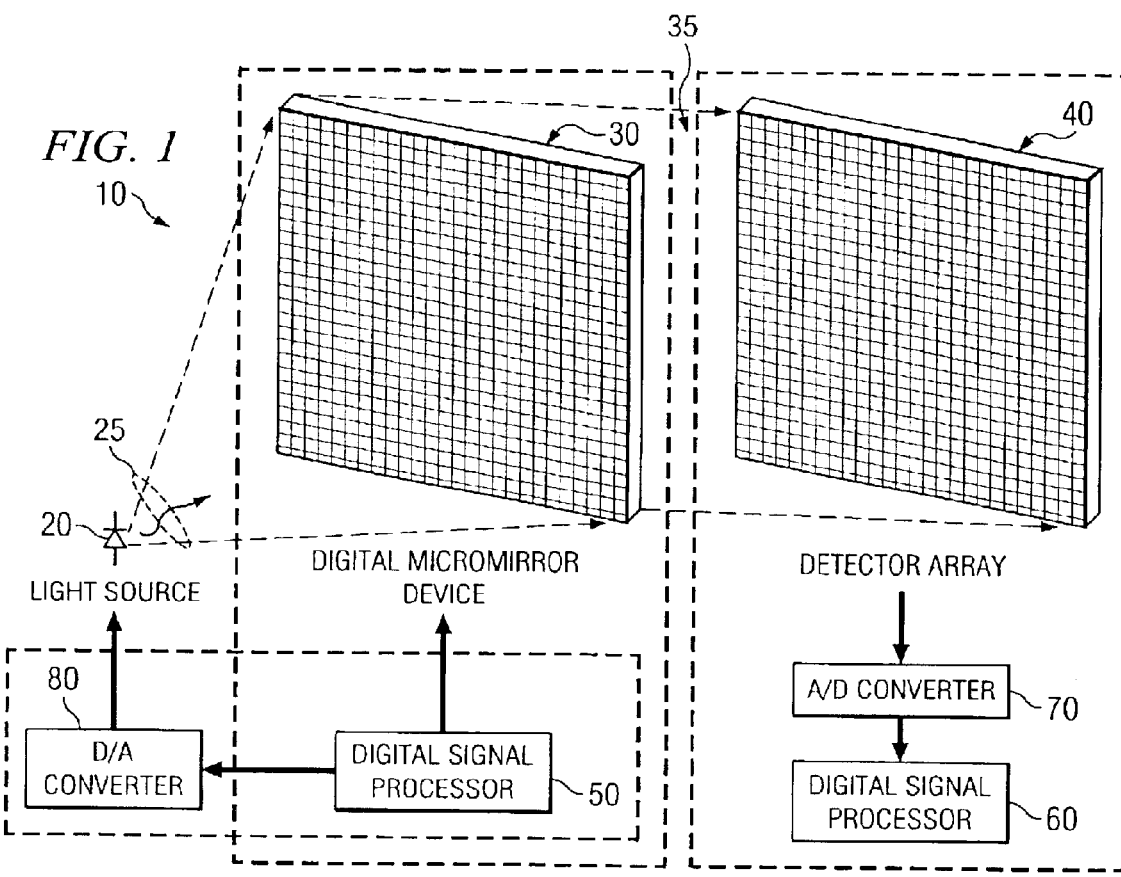
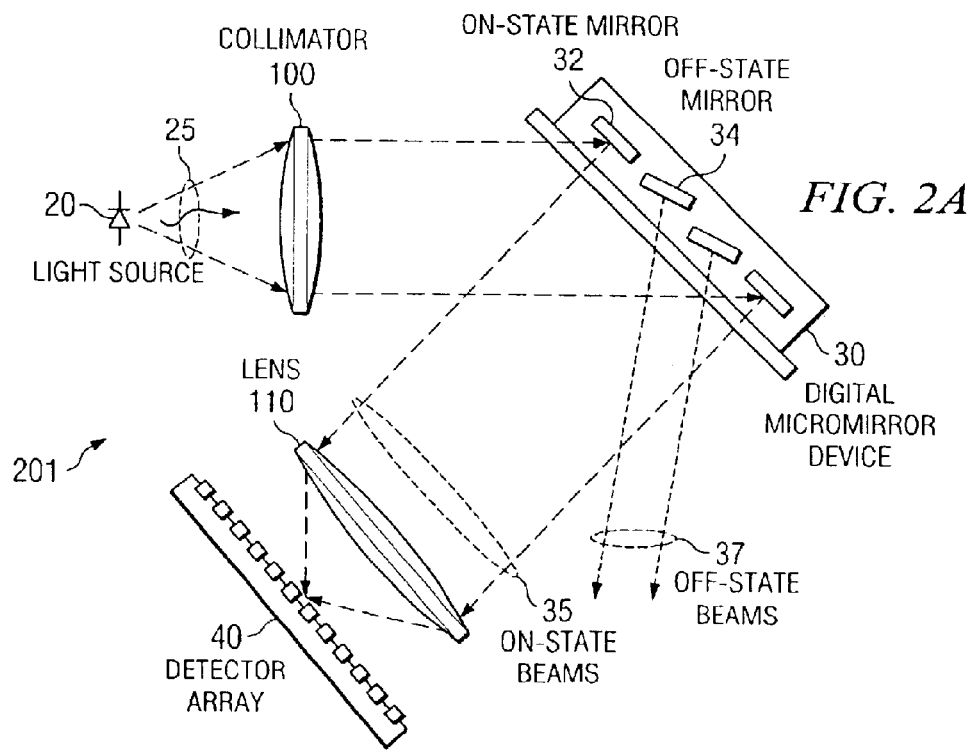

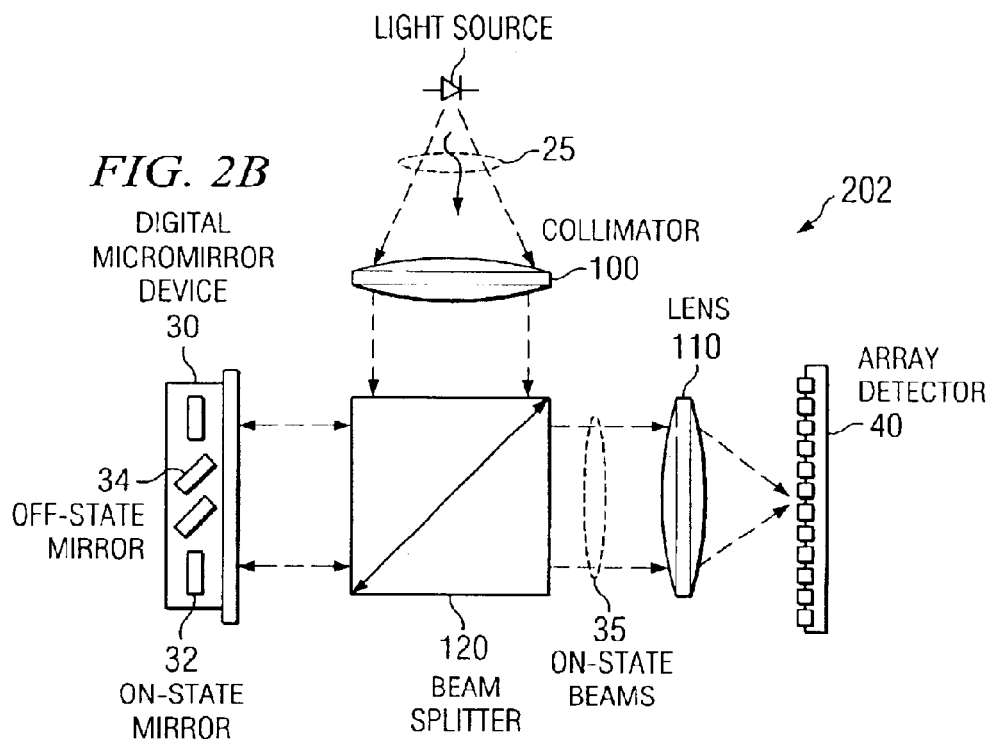
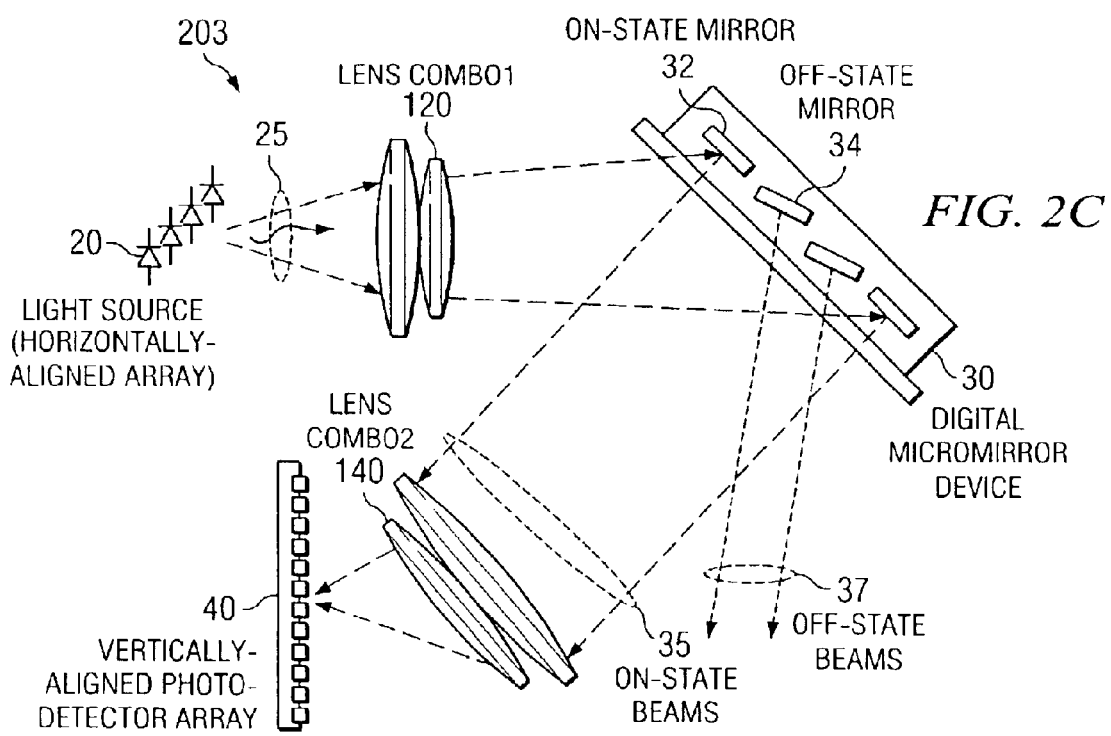

SQUARE (4x4) PATTERN 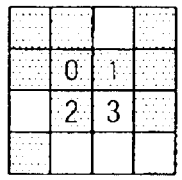 =0123$_{DIBIT}$
=1B$_{HEX}$
RECTANGULAR (2x8) PATTERN  =0123$_{DIBIT}$
=1B$_{HEX}$
RECTANGULAR (8x2) PATTERN 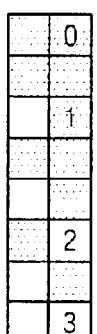 =0123$_{DIBIT}$
=1B$_{HEX}$
*FIG. 6B*
*FIG. 7*

OPTICAL DIGITAL SIGNAL PROCESSING SYSTEM AND METHOD

TECHNICAL FIELD OF THE INVENTION

This invention relates generally to optical signal processing and, more specifically, to optical digital signal processing.

BACKGROUND OF THE INVENTION

Current optical signal processing systems include input modulation that is analog. This discrete analog input is used to drive the input light source. Conventional systems use analog spatial light modulators (SLMs) and therefore the output is also analog. Further, the detector array is also analog, often with limited precision, and normally requires its output to be digitized via an analog-to-digital (A/D) converter. The precision of the digitized output is then limited to the number of bits of the A/D dynamic range (e.g. 12~16 bits). Accordingly, precision loss may occur during A/D conversion. On the other hand, conventional digital SLMs comprised of binary micromirrors require 65,536 ($2^{16}$) mirrors to represent a sixteen bit number.

SUMMARY OF THE INVENTION

In accordance with the present invention, the disadvantages and problems associated with analog and binary digital SLMs have been substantially reduced or eliminated.

One aspect of the invention is a method for optical digital signal processing, that comprises configuring a plurality of binary mirrors to allow a subset of the binary mirrors to represent a range of values. The plurality of binary mirrors comprises a digital micromirror device. Light from a light source is received at the digital micromirror device. The intensity of the light is altered to represent one of the values based, at least in part, on the configuration of the subset of the binary mirrors. The altered light is transmitted from the digital micromirror device to a detector array.

BRIEF DESCRIPTION OF THE DRAWINGS

For a more complete understanding of the present invention and its advantages, reference is now made to the following descriptions, taken in conjunction with the accompanying drawings, in which:

FIG. 1 is a diagram of an optical digital signal processing system in accordance with one embodiment of the present invention;

FIGS. 2A–C illustrate alternative embodiments of the optical digital signal processing system of FIG. 1;

FIGS. 6A–D illustrate various arrangements for representing analog values to improve detectability by the detector array in accordance with the Radix subsets of FIG. 5A and FIG. 4A; and FIG. 7 illustrates a portion of the digital micromirror device in accordance with the optical digital signal processing system of FIG. 1.

DETAILED DESCRIPTION OF EXAMPLE EMBODIMENTS OF THE INVENTION

Figure 3A:
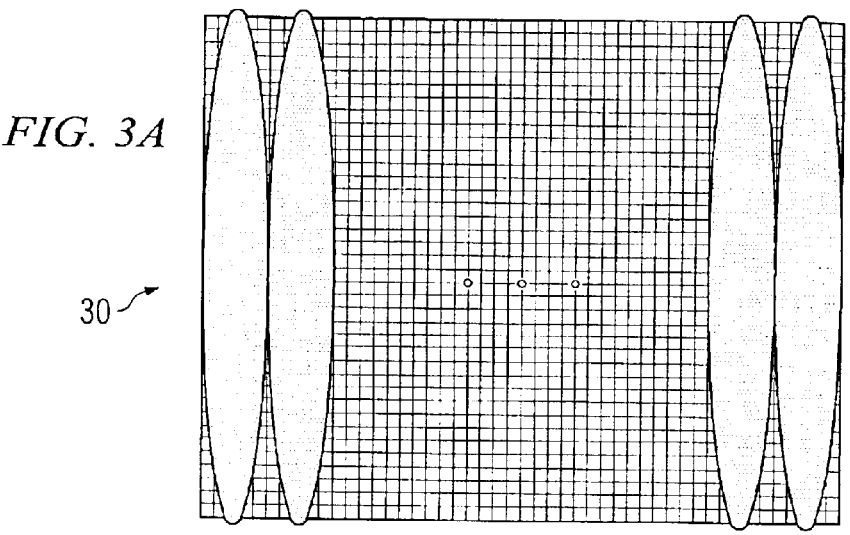
FIGS. 3A–B illustrate operations of the lenses in accordance with the parallel optical digital signal processing system of FIG. 2C.

FIG. 1 illustrates one embodiment of an optical digital signal processing system 10. Other embodiments of optical digital signal processing system 10 may be formed without departing from the scope of this disclosure. In general, the present invention offers optical digital signal processing with integration, resolution, accuracy, and programmability not afforded by analog optical systems.

Optical digital signal processing system 10 includes light source 20, digital micromirror device (DMD) 30, detector array 40, first digital signal processor 50, second digital signal processor 60, analog-to-digital (A/D) converter 70, and digital-to-analog (D/A) converter 80. Light source 20, digital micromirror device 30, and detector array 40 are optically connected. Each component may be optically coupled through lenses, collimators, or other suitable optical devices, as illustrated in FIGS. 2A–C. Light source 20 is a device that emits light energy 25 in the direction of DMD 30 to initiate optical signal processing. Light source 20 may include one or more light-emitting diodes (LEDs), injection laser diodes (ILDS), Vertical Cavity Surface Emitting Lasers (VCSEL), an array of light sources, or any other appropriate device operable to emit light energy 25. Light source 20 is controlled by digital signal processor 50.

Digital signal processor 50 is coupled to light source 20 and DMD 30. In certain embodiments, digital signal processor 50 is coupled to light source 20 through D/A converter 80. Digital signal processor 50 may be a reduced-functionality digital signal processor, such that there are no multipliers present in digital signal processor 50. Therefore, reduced-functionality digital signal processor 50 may have much less power dissipation than traditional digital signal processors. According to particular embodiments, digital signal processor 50 generates and digitizes an input sequence that drives light source 20. The generated analog input signal may be digitized via pulse-code-modulation (PCM) or pulse-width-modulation (PWM) to produce an input signal with digital precision. If present, D/A converter 80 converts the digital input signal to an analog control signal, which is communicated to and controls light source 20. It should be understood that if the input sequence was digitized using PWM, then D/A converter 80 is not necessary. Digital signal processor 50 is further operable to configure and program DMD 30 to allow DMD 30 to process analog optical signals with digital precision.

Digital micromirror device (DMD) 30 is a digital form of a spatial light modulator that acts as a matrix mask configured by digital signal processor 50. In general, DMD 30 processes energy 25 received from light source 20 into an image 35, based on the configuration, and transmits the resulting image 35 to detector array 40. In one embodiment, DMD 30 is an electromechanical device including a pixel array, such as a 768×1024 array, of digital tilting mirrors or baseline binary pixels or mirrors. Each binary mirror may tilt by a plus or minus angle (e.g. ten or twelve degrees) for the active "on" or "off" positions. To permit the mirrors to tilt, each is attached to one or more actuators such as, for example, hinges mounted on support posts over underlying control circuitry. The control circuitry provides electrostatic forces that causes each mirror to selectively tilt. Incident light on the mirror array is reflected by the "on" mirrors in one direction and by the "off" mirrors in the other direction. The configurable pattern of "on" versus "off" mirrors forms image 35. Accordingly, image 35 is energy that is reflected by the "on" mirrors in DMD 30 and generally projected to detector array 40. It should be understood that system 10 may use "off" mirrors instead of "on" mirrors to form image 35 to achieve the desired intensity of image 35.

Detector array 40 may be a photo-detector array (PDA), a charge-coupled device (CCD) detector array, CMOS array imager, or any other suitable image detection device operable to obtain a spectral response from image 35. In general, detector array 40 includes a plurality of detectors that receive image 35 and converts the constituent optical signals into electrical signals that may be further processed by components of system 10. Accordingly, detector array 40 converts the energy from image 35 into a series of successive electrical pulses, which are output to digital signal processor 60.

Digital signal processor 60 is coupled with detector array 40 through A/D converter 70. A/D converter 70 converts the analog input signal from detector array 40 to a multi-bit digital output signal, which is supplied to digital signal processor 60. Further, digital signal processor 60 may be a reduced-functionality digital signal processor, such that there are no multipliers present in digital signal processor 60. Therefore, reduced-functionality digital signal processor 60 may have much less power dissipation than traditional digital signal processors.

It should be understood that while FIG. 1 illustrates light source 20, DMD 30, detector array 40, first digital signal processor 50, second digital signal processor 60, A/D converter 70, and D/A converter 80 as separate components of system 10, one or more of these components may be integrated into a single module or chip. For example, DMD 30, digital signal processor 50 and D/A converter 80 may be formed on a single chip. Alternatively, or in addition, detector array 40, second digital signal processor 60, and A/D converter 70 may be formed on a second chip.

In one aspect of operation, digital signal processor 50 configures DMD 30 such that optical signal processing may be performed with digital precision. Accordingly, digital signal processor 50 configures DMD 30 to allow one or more subsets of binary mirrors to each represent a range of values. Digital signal processor 50 may dynamically configure DMD 30 in order to electronically process digital signals based on various optical properties. For example, digital signal processor 50 may configure a first subset of four binary mirrors to represent a range of values between "0" and "3". In another example, digital signal processor 50 may configure a first subset of sixteen binary mirrors to represent a range of values between "0" and "15". System 10 may also allow for the represented range of values to include negative values. The negative values may be represented through any appropriate technique such as, for example, twos complement, least significant bit-inversion, redundant signed digits, or any higher radix representation. For example, digital signal processor 50 may configure the subset of binary mirrors such that a photonegative pattern may be reflected. According to particular embodiments, this photonegative pattern may be the reverse of another pattern. For example, if a first pattern includes the first mirror in the "on" position and the remaining mirrors in the "off" position, then the photonegative pattern of the first pattern may include the first mirror in the "off" position and the remaining mirrors in the "on" position. It should be understood that system 10 may assign each "on" mirror a value of 1, with each "off" mirror assigned a value of 0 or use any other appropriate valuation scheme or technique.

Based on various configurations, each subset may each be assigned a mathematical weight to allow each subset to represent a different portion of a single datum, which may be based on the number of mirrors per subset. For example, a first subset of sixteen mirrors may represent a first nibble of data ($16^0$) and a second subset of sixteen mirrors may represent a second nibble of data ($16^1$). The configuration process may further include aligning light source 20 with DMD 30. Generally, aligning light source 20 with DMD 30 may include "chasing" emitted light energy 25 on DMD 30. For example, digital signal processor 50 instructs light source 20 to emit a short beam of light energy 25 to a selected first subset of binary mirrors that represents the range of values. In response to a second subset being illuminated by energy 25, digital signal processor selects the second subset to represent the range of values and replaces the first subset with the selected second set.

Once digital signal processor 50 configures DMD 30, system 10 may use the various components for optical digital signal processing. To initiate an optical signal, digital signal processor 50 generates an input sequence that drives light source 20. Digital signal processor 50 may digitize the generated input sequence and communicate the digital input sequence to light source 20. In one embodiment, the communicated digital input sequence is processed by D/A converter 80, which converts the digitized sequence into an analog control signal that drives light source 20.

Based upon the input sequence, light source 20 emits energy 25 towards at least a portion of DMD 30. Generally, DMD 30 receives energy 25 and digitally forms a reflected image 35 for subsequent numerical processing. Accordingly, DMD 30 receives commands from digital signal processor 50 and appropriately arranges none, some, or all of the binary mirrors in each subset to be in the "on" position. Energy 25 is reflected by the "on" mirrors towards detector array 40 and forms image 35. For example, DMD 30 may activate none of a first set of binary mirrors, such that the subset represents the analog value "0". DMD may then activate three binary mirrors in a second subset to be in the "on" position, which would represent the analog value "3". These reflections from the "on" binary mirrors, digitally representing the analog values, produce image 35 with digital precision.

Image 35 is received by one or more detectors of detector array 40 for conversion and subsequent processing. Detector array converts the optical signals from image 35 into analog electrical signals and communicates the electrical signals to digital signal processor 60 through A/D converter 70. A/D converter 70 converts each analog signal into a multi-bit digital signal and transmits the resulting digital signal to digital signal processor 60. As image 35 was formed with digital techniques, there should be substantially less precision loss during conversion by A/D converter 70. Digital signal processor 60 receives and processes the converted signals using any appropriate digital signal processing technique.

FIG. 2A illustrates an example embodiment of a serial optical digital signal processing system 201. In general, system 201 processes beams of energy 25 to produce image 35 in a serial, or one-by-one, fashion.

System 201 includes collimator 100 and lens 110. Collimator 100 directs energy 25 to the appropriate portion of DMD 30, which may include one or more subsets of binary mirrors. Collimator 100 may be any optical collimator with an optical scheme that can produce a beam of parallel rays of energy. Energy 25 is directed to DMD 30 and is reflected from mirrors 34 that are in the "off" position to form a second image 37. Image 37 is directed away from detector array 40 such that image 37 does not distort image 35. Energy 25 that reflects from mirrors 32, which are activated to be in the "on" position, forms image 35 and is directed towards detector array 40 through lens 110.

Lens 110 is any lens and/or mirror that directs the line of sight of image 35 to detector array 40 and, further, may be multi-spectral refractive or reflective. Lens 110 allows oversampling of the image 35 from DMD 30 to detector array 40 through optically linking each subset of binary mirrors to a single detector in detector array 40. For example, lens 110 may focus the portion of image 35 from one subset of sixteen mirrors to one detector. In another example, if image 35 of the sixteen mirrors is now focused onto an area of sixteen detectors then an oversampling of image 35 of sixteen times is achieved for more precision. In general, the use of oversampling may allow for a significantly higher detection precision or the use of a much smaller detector array 40 with fewer detectors.

In one aspect of operation, light source 20 emits energy 25 towards DMD 30 through collimator 100. Collimator 100 bends light energy 25 to focus on the desired portion of DMD 30. "On" mirrors 32 reflect the directed energy 25 to form image 35. Image 35 is focused towards the desired portion of detector array 40 using lens 110.

FIG. 2B illustrates another embodiment of a serial optical digital signal processing system 202. Similar to system 201, system 202 performs serial optical digital signal processing. In addition to the components of system 201, system 202 includes beamsplitter 120 that allows for less overall space being required for system 10. Beamsplitter 120 is capable of splitting energy 25 from image 35 and may include a beamsplitter, a reflector plate that guides beams of light, or any mirror or prism or a combination of the two that is used to divide energy into two or more parts. Beamsplitter 120 simultaneously reflects, or directs, energy 25 to DMD 30 and allows passage of image 35 to detector array 40.

In one aspect of operation, light source 20 emits energy 25 towards DMD 30 through collimator 100. Collimator 100 bends light energy 25 to focus on the desired portion of beamsplitter 120. Beamsplitter 120 reflects the substantially all of energy 25 towards DMD 30. "On" mirrors 32 reflect the directed energy 25 to form image 35. Image 35 travels through beamsplitter 120 and is focused towards the desired portion of detector array 40 using lens 110.

FIG. 2C illustrates an example embodiment of parallel optical digital signal processing system 203. In general, system 203 processes beams of energy 25 to produce image 35 in a parallel fashion allowing the optical processing of vector inner products. In this embodiment, light source 20 includes a plurality of input diodes horizontally positioned to DMD 30 such that each input diode can transmit to an entire column of subsets of mirrors. According to one embodiment, the number of input diodes should substantially equal the number of columns of subsets. Also, detector array 40 is vertically positioned to DMD 30 such that the portion of image 35 reflected from each row of subsets can be summed by a single detector.

System 203 includes lens combination 120 and lens combination 140. Lens combination 120 spreads energy 25 from each input diode vertically to the respective column of subsets of binary mirrors associated with DMD 30. According to a particular embodiment, lens combination 120 includes a spherical lens followed by a cylindrical lens that has no power in the vertical direction. Therefore, lens combination 120 collimates light diverging vertically while directing light horizontally to the entire column of subsets, as illustrated in FIG. 3A.

Figure 3B:
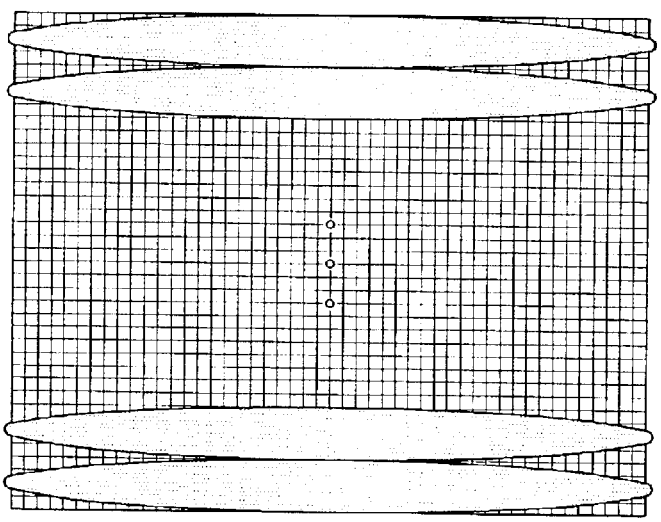

Lens combination 140 reduces the portion of image 35 from an entire row of subsets to a single detector in detector array 40. According to a particular embodiment, lens combination 140 includes a spherical lens followed by a cylindrical lens that has no power in the horizontal direction consequently, light from each row of subsets is focused horizontally but directed vertically to the respective detector as illustrated in FIG. 3B. Therefore, the light from input source 20 is spread vertically such that each detector detects a vector inner product of the light.

The preceding illustrations and accompanying descriptions provide exemplary diagrams for implementing various optical digital signal processing schemes. However, these figures are merely illustrative, and system 10 contemplates using any suitable combination and arrangement of elements for implementing various optical digital signal processing schemes. Thus, these systems may include any suitable combination and arrangement of elements for processing energy 25 to produce an image 35 for digital signal processing. Moreover, the operations of the various illustrated systems may be combined and/or separated as appropriate. For example, optical digital signal processing 10 may include components from example serial systems 201 and 202 and parallel system 203 as appropriate.

Figure 4A:
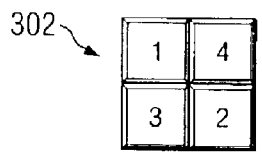
FIGS. 4A–D illustrate various embodiments of a Radix-4 subset in accordance with the optical digital signal processing system of FIG. 1.
Figure 4B:
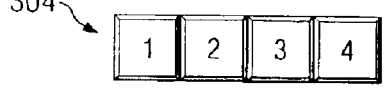
Figure 4C:

FIGS. 4A–D illustrate various embodiments of a Radix-4 subset in accordance with optical digital signal processing system 10. In general, the Radix-4 subset is a four-mirror subset of the plurality of binary mirrors included in DMD 30. The Radix-4 subset allows optical digital signal processing system 10 to configure four binary mirrors to represent a range of four analog values such as, for example, "0"–"3". Illustrated in FIG. 4A is a square Radix-4, or dibit, subset 302. Radix-4 subset 302 includes a first, second, third, and fourth binary mirror. In this example embodiment, the first and second mirrors are diagonally positioned in relation to one another. Further, the third and fourth binary mirrors are diagonally positioned from one another and further positioned in relation to the first and second binary mirrors to form a 2×2 square pattern. Illustrated in FIG. 4B, are four similar binary mirrors that are horizontally positioned in relation to one another creating a 1×4 binary mirror subset. Illustrated in FIG. 4C, are four similar binary mirrors vertically positioned in relation to one another to form a 4×1 rectangular binary mirror subset.

Figure 4D:
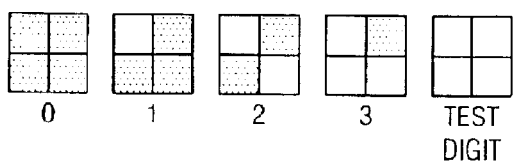

FIG. 4D illustrates one aspect of operation of the Radix-4 square pattern 302, as illustrated in FIG. 3A. As illustrated in FIG. 4D, the Radix-4 subset may represent five values based upon whether the individual binary mirrors are in the "on" or "off" positions. For example, if all four binary mirrors are in the "off" position, optical digital signal processing system 10 may interpret this subset of binary mirrors as representing an analog value "0". Activating the first binary mirror to be in the "on" position, changes the analog value represented by the subset to "1". Further activating the second binary mirror changes the analog value of the subset to "2". Additionally, activating the third binary mirror changes the analog dibit value to "3". According to particular embodiments, activating the fourth binary mirror, resulting in all four binary mirrors being in the "on" position, illustrates a test digit that may be used to verify proper functioning of optical digital signal processing system 10 or a numerical overflow signal for processing vectors.

Figure 5A:
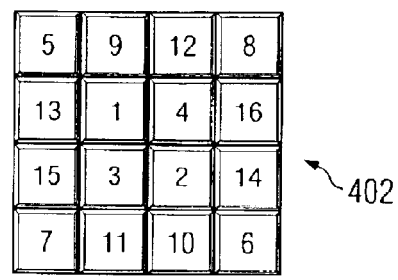
FIGS. 5A–C illustrate various embodiments of a Radix-16 subset in accordance with the optical digital signal processing system of FIG. 1.
Figure 5B:
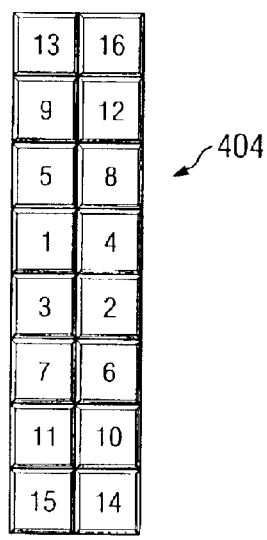
Figure 5C:

FIGS. 5A–C illustrate various embodiments of a Radix-16 subset in accordance with optical digital signal processing system 10. In general, the Radix-16 subset is a sixteen-mirror subset of the plurality of binary mirrors included in DMD 30. The Radix-16 subset allows optical digital signal processing system 10 to configure sixteen binary mirrors to represent a range of sixteen analog values such as, for example, "0"–"15". Illustrated in FIG. 5A, is a 4×4 Radix-4, or HEX, square subset 402. Illustrated in FIG. 5B, is an 8×2 Radix-16 subset 404. Radix-16 subset 404 includes a first column of eight binary mirrors, each positioned vertically in relation to the other seven. Radix-16 subset 404 further includes a second column of eight binary mirrors, each also positioned vertically in relation to one another in the second column. Illustrated in FIG. 5C, is a 2×8 Radix-16 subset 406. Radix-16 subset 406 includes a first row eight binary mirrors, each positioned horizontally in relation to the other seven binary mirrors. Radix-16 subset 406 further includes a second row of eight binary mirrors, each binary mirror also positioned horizontally in relation to the other seven in the second row.

Figure 6A:
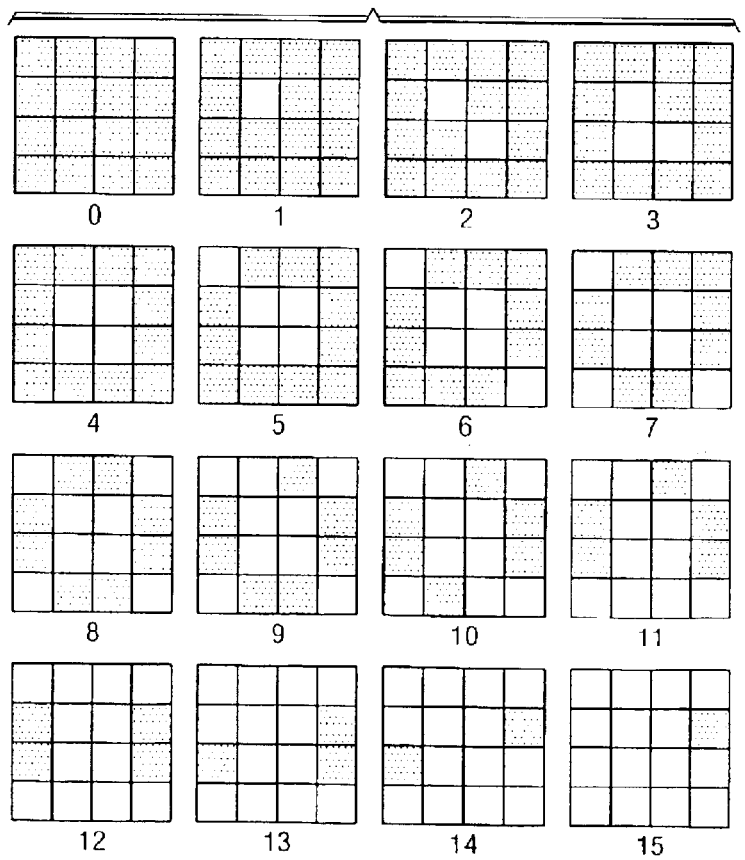

FIGS. 6A–D illustrate various arrangements for representing analog values to improve detectability by detector array 40 in accordance with the Radix-16 subset 402 of FIG. 5C and the Radix-4 subset 302 of FIG. 4A. FIG. 6A illustrates square Radix-16 subset 402 that is configured to represent sixteen analog values such as, for example, "0"–"15". In the illustrated embodiment, the shaded squares illustrate a binary mirror in the "off" position, while the light squares represent a binary mirror in the "on" position. As described above; digital signal processor 50 arranges the subset of binary mirrors to represent one of the range of values. As illustrated, if digital signal processor 50 determines that this subset should represent the analog value "0", then digital signal processor 50 communicates the appropriate signal to DMD 30. In response to the signal, DMD 30 insures that all sixteen mirrors are arranged in the "off" position. It should be understood that to achieve the desired arrangement, DMD 30 may switch the appropriate binary mirrors from the "on" to the "off" position and leave the remaining binary mirrors in the "off" position.

In response to a signal requesting the analog value "1", DMD 30 selects a first mirror from the subset and activates the mirror to be in the "on" position. According to particular embodiments, the first mirror is located in a central position in the subset to improve detectability by detector array 40. In response to a signal requesting the analog value "2", DMD 30 selects a second mirror from the subset. According to particular embodiments, DMD 30 selects the second mirror that is diagonally positioned to the first mirror. This may improve detectability by detector array 40 by decreasing the chances of overlap of the portion of image 35 transmitted by the first and second mirror. It may further decrease the probability of overlap between the illustrated subset and a second subset (illustrated in more detail in FIG. 7). In response to signals for increased analog values, DMD 30 continues to select and activate additional binary mirrors, to be in the "on" position, in locations that improve detectability by detector array 40 over other arrangements. Similar to FIG. 4D, when all sixteen mirrors of the subset are activated to be in the "on" position, the subset may represent a test digit or numerical overflow.

FIG. 6B illustrates three example arrangements of Radix-4 subsets 302 for numeric processing. Each example includes four subsets of four binary mirrors, illustrated as square pattern Radix-4 subset 302. It should be understood that this is for illustration purposes only and that any number of mirrors, in any configuration, may be used for signal processing.

Returning to the example, the first Radix-4 subset 302 includes three of four mirrors activated to be in the "on" position to represent the analog value "3". The second Radix-4 subset 302 has two of the four binary mirrors activated to be in the "on" position in order to represent the analog value "2". The third Radix-4 subset 302 has one mirror activated to be in the "on" position in order to represent the analog value "1". The fourth Radix-4 subset 302 has no mirrors activated to be in the "on" position and represents the analog value "0". Each subset has been given a weight based on the power of four, which is based on the number of mirrors per subset. For illustration purposes only, the first Radix-4 subset 302 is assigned a weight based on four to the power of zero. The second Radix-4 subset 302 is assigned the weight four to the power of one. The third Radix-4 subset 302 is assigned the weight four to the power of two. The fourth Radix-4 subset 302 is assigned the weight four to the power of three. This results in a numerical value of "27" and is represented as "0123" dibit or "1B" HEX. As illustrated, the four Radix-4 subsets may be arranged in a square (2×2) pattern 302, a rectangular (1×4) pattern 304, or a rectangular (4×1) pattern 306.

Figure 6C:
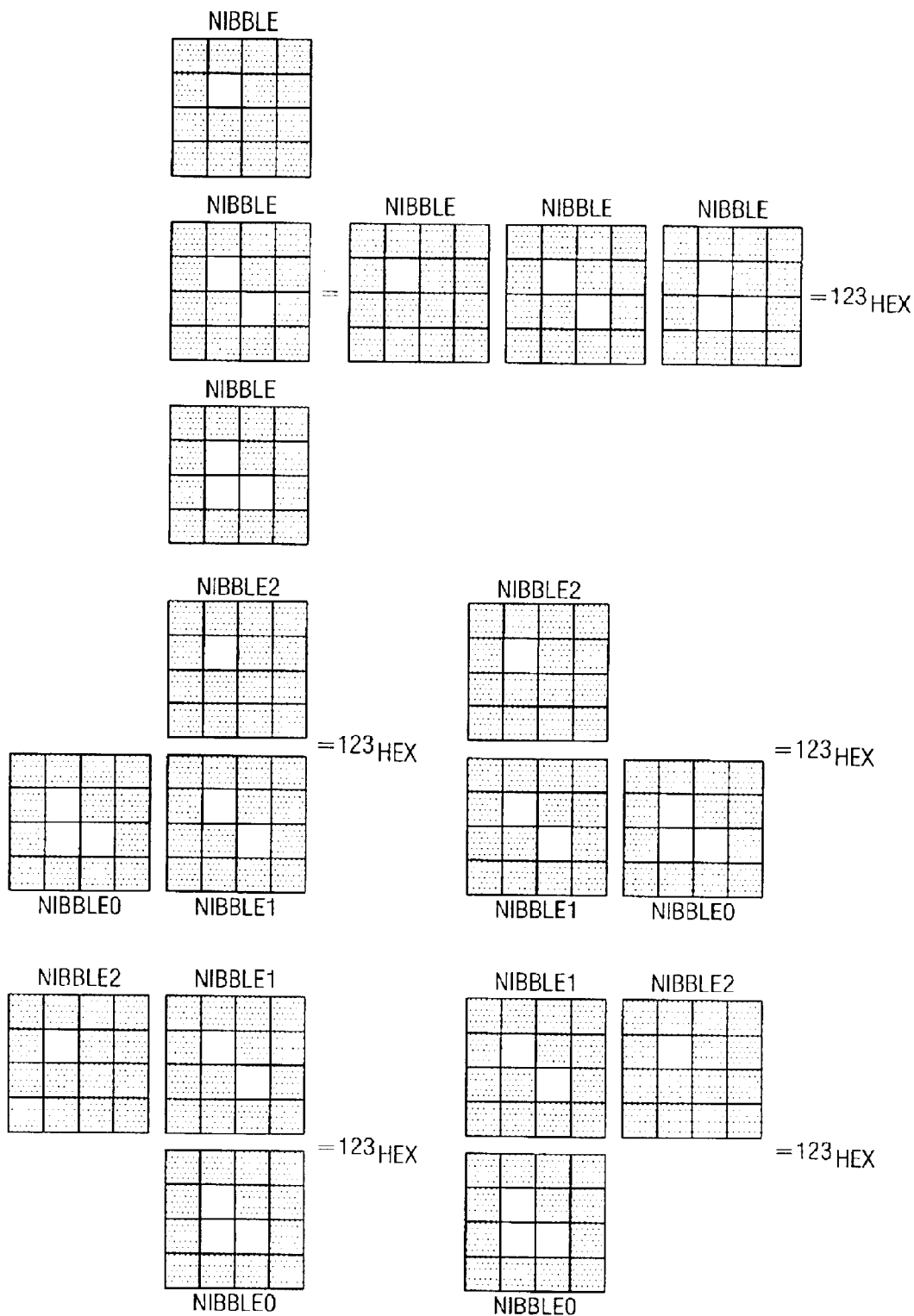

FIG. 6C illustrates six example arrangements of Radix-16 subsets 402 for numeric processing. Each example includes three subsets of sixteen binary mirrors, illustrated as square pattern Radix-16 subset 402. It should be understood that this is for illustration purposes only and that any number of mirrors, in any configuration or pattern, may be used for signal processing.

Returning to the example, the first Radix-16 subset 402 includes three of sixteen mirrors activated to be in the "on" position to represent the analog value "3". The second Radix-16 subset 402 has two of the sixteen binary mirrors activated to be in the "on" position in order to represent the analog value "2". The third Radix-16 subset 402 has one mirror activated to be in the "on" position in order to represent the analog value "1". Each subset has been given a weight based on the power of sixteen, which is based on the number of mirrors per subset. For illustration purposes only, the first Radix-16 subset 402 is assigned a weight based on sixteen to the power of zero. The second Radix-16 subset 402 is assigned the weight sixteen to the power of one. The third Radix-16 subset 402 is assigned the weight sixteen to the power of two. This results in a numerical value of "0123" HEX. As illustrated, the three Radix-16 subsets may be arranged in a rectangular (1×3) pattern, a rectangular (3×1) pattern, or various other patterns.

Figure 6D:
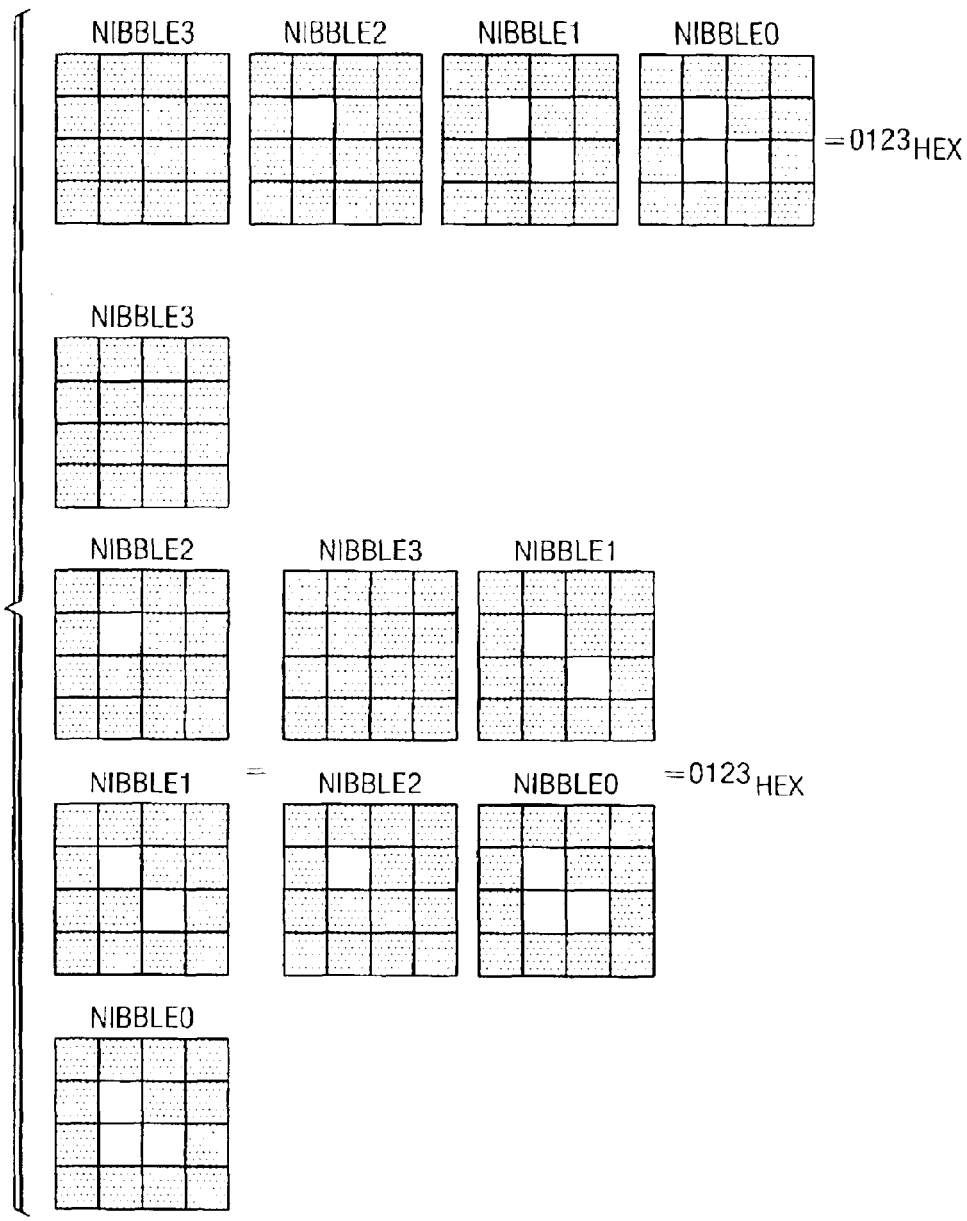

FIG. 6D illustrates three example arrangements of Radix-16 subsets 402 for numeric processing. Each example includes four subsets of sixteen binary mirrors, illustrated as square pattern Radix-16 subset 402. It should be understood that this is for illustration purposes only and that any number of mirrors, in any configuration, may be used for signal processing.

Returning to the example, the first Radix-16 subset 402 includes three of sixteen mirrors activated to be in the "on" position to represent the analog value "3". The second Radix-16 subset 402 has two of the sixteen binary mirrors activated to be in the "on" position in order to represent the analog value "2". The third Radix-16 subset 402 has one mirror activated to be in the "on" position in order to represent the analog value "1". The fourth Radix-16 subset 402 has no mirrors activated to be in the "on" position and represents the analog value "0". Each subset has been given a weight based on the power of sixteen, which is based on the number of mirrors per subset. For illustration purposes only, the first Radix-16 subset 402 is assigned a weight based on sixteen to the power of zero. The second Radix-16 subset 402 is assigned the weight sixteen to the power of one. The third Radix-16 subset 402 is assigned the weight sixteen to the power of two. The fourth Radix-16 subset 402 is assigned the weight sixteen to the power of three. This results in a numerical value of "0123" HEX. As illustrated, the four Radix-16 subsets may be arranged in a square (2×2) pattern, a rectangular (1×4) pattern, a rectangular (4×1) pattern, or any other appropriate pattern that may improve detectability or processing.

FIG. 7 illustrates an example portion of DMD 30 in accordance with optical digital signal processing system 10. This exemplary portion of DMD 30 includes four square Radix-16 subsets 402 and is substantially delimited by guard pixels 36. Each guard pixel 36 is a binary mirror, which is not activated, that is not configured to be included in one of the subsets. This allows system 10 to use dead space to ensure that the portion of image 35 reflected from each subset 402 does not interfere with or corrupt other portions of image 35. The illustrated portion of DMD 30 is surrounded by a perimeter of guard pixels 36. Further, each subset 402 is separated from each other by a row or column of guard pixels 36, as appropriate.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke ¶ 6 of 35 U.S.C. § 112 as it exists on the date of filing hereof unless "means for" or "step for" are used in the particular claim.

What is claimed is:

1. A method for optical digital signal processing, comprising:
   configuring a plurality of binary mirrors to allow a subset of the binary mirrors to represent a range of values, the plurality of binary mirrors comprising a digital micromirror device;
   receiving light from a light source at the digital micromirror device;
   altering the intensity of the light to represent one of the values based, at least in part, on the configuration of the subset of the binary mirrors; and
   transmitting the altered light from the digital micromirror device to a detector array.

2. The method of claim 1, wherein altering the intensity of the light comprises arranging the subset of binary mirrors in a pattern to improve detectability by the detector array.

3. The method of claim 2, wherein arranging the subset of binary mirrors in a pattern to improve detectability by the detector array comprises:
   activating a first mirror from the subset to be in an on position;
   selecting a second mirror from the subset, the second mirror being positioned diagonally to the first mirror; and
   activating the selected second mirror to be in the on position.

4. The method of claim 3, further comprising:
   selecting a third mirror from the subset, the third mirror being substantially adjacent to the first and second mirrors; and
   activating the selected third mirror to be in the on position.

5. The method of claim 4, further comprising:
   selecting a fourth mirror from the subset, the fourth mirror being substantially adjacent to the first and second mirrors;
   selecting a fifth mirror from the subset, wherein the fifth mirror being positioned diagonally to at least one of the selected mirrors;
   activating the selected fourth mirror to be in the on position; and
   activating the selected fifth mirror to be in the on position.

6. The method of claim 1, wherein the subset of binary mirrors comprises four mirrors and the range of values is between zero and three.

7. The method of claim 6, wherein the subset of binary mirrors are in a 4×1 configuration.

8. The method of claim 6, wherein the subset of binary mirrors are in a 2×2 configuration.

9. The method of claim 1, wherein the subset of binary mirrors comprises sixteen mirrors and the range of values is between zero and fifteen.

10. The method of claim 1, wherein the subset of the binary mirrors comprises a first subset of binary mirrors and the method further comprises:
    receiving the light at a second subset of binary mirrors;
    reconfiguring the plurality of binary mirrors to allow the second subset of the binary mirrors to represent the range of values; and
    altering the intensity of the light to represent one of the values based, at least in part, on the configuration of the second subset of the binary mirrors.

11. The method of claim 1, further comprising:
    generating an input sequence operable to drive the light source;
    digitizing the generated input sequence; and
    communicating the digital input sequence to the light source.

12. The method of claim 9, further comprising oversampling the light from the digital micromirror device to the detector array.

13. The method of claim 12, wherein oversampling the light from the digital micromirror device to the detector array comprises optically linking the sixteen binary mirrors to sixteen detectors.

14. The method of claim 1, wherein the subset of the binary mirrors comprises a first subset of binary mirrors and the first subset represents a first nibble of data and the method further comprises:
    configuring the plurality of binary mirrors to allow a second subset of the binary mirrors to represent the range of values, the second subset of binary mirrors representing a second nibble of data; and
    altering the intensity of the light to represent one of the values based, at least in part, on the configuration of the second subset of the binary mirrors.

15. The method of claim 14, further comprising linking the first subset of the binary mirrors and the second subset of the binary mirrors to represent a byte of data.

16. The method of claim 15, wherein the first subset of the binary mirrors is weighted by sixteen to the zero power and the second subset of the binary mirrors is weighted by sixteen to the first power.

17. The method of claim 16, further comprising:
    configuring the plurality of binary mirrors to allow a third subset of the binary mirrors to represent the range of values, the third subset of binary mirrors representing a third nibble of data;

altering the intensity of the light to represent one of the values based, at least in part, on the configuration of the third subset of the binary mirrors; and linking the third subset of the binary mirrors with the first and second subsets of the binary mirrors to represent a 12-bit word, wherein the third subset of binary mirrors is weighted by sixteen to the second power.

18. The method of claim 17, wherein the second subset of binary mirrors is positioned vertically adjacent to the first subset of binary mirrors and horizontally adjacent to the third subset of binary mirrors.

19. The method of claim 17, wherein the second subset of binary mirrors is positioned vertically adjacent to the first subset of binary mirrors and vertically adjacent to the third subset of binary mirrors.

20. The method of claim 17, further comprising:

configuring the plurality of binary mirrors to allow a fourth subset of the binary mirrors to represent the range of values, the fourth subset of binary mirrors representing a fourth nibble of data;

altering the intensity of the light to represent one of the values based, at least in part, on the configuration of the fourth subset of the binary mirrors; and linking the fourth subset of the binary mirrors with the first, second, and third subsets of the binary mirrors to represent a 16-bit word, wherein the fourth subset of binary mirrors is weighted by sixteen to the third power.

21. The method of claim 20, further comprising arranging the subsets of binary mirrors in a pattern to improve detectability by the detector array.

22. The method of claim 21, wherein the second subset of binary mirrors is positioned vertically adjacent to the first subset of binary mirrors and horizontally adjacent to the fourth subset of binary mirrors and the third subset of binary mirrors is positioned horizontally adjacent to the first subset of binary mirrors and vertically adjacent to the fourth subset of binary mirrors.

23. The method of claim 21, wherein the second subset of binary mirrors is positioned vertically adjacent to the first subset of binary mirrors and vertically adjacent to the third subset of binary mirrors and the third subset of binary mirrors is positioned vertically adjacent to the second subset of binary mirrors and vertically adjacent to the fourth subset of binary mirrors.

24. The method of claim 1, wherein configuring a plurality of binary mirrors to allow a subset of the binary mirrors to represent a range of values comprises configuring the plurality of binary mirrors to allow the subset of the binary mirrors to represent a range of negative values.

25. The method of claim 24, wherein altering the intensity of the light to represent one of the values comprises arranging the subset of binary mirrors in a photonegative pattern.

26. The method of claim 24, wherein the representation of the range of negative values is in twos complement.

27. An optical digital signal processing system, comprising:

a light source;

a detector array comprising a plurality of detectors;

a digital micromirror device comprising a plurality of rows and columns of binary mirrors, the digital micromirror device operable to receive light from the light source and each mirror is operable to illuminate one of the detectors in response to being in an on position; and a digital signal processor coupled to the digital micromirror device and the light source, the digital signal processor operable to configure the digital micromirror device to allow a subset of the binary mirrors to represent a range of values and generate an input sequence operable to drive the light source.

28. The optical digital signal processing system of claim 27, wherein the digital micromirror device is further operable to alter the intensity of the received light to represent one of the values based, at least in part, on the configuration of the subset of the binary mirrors.

29. The optical digital signal processing system of claim 28, wherein:

the subset of the binary mirrors comprises a first subset of binary mirrors; and in response to receiving the light at a second subset of binary mirrors:

the digital signal processor is further operable to reconfigure the plurality of binary mirrors to allow the second subset of the binary mirrors to represent the range of values; and the digital micromirror device is further operable to alter the intensity of the light to represent one of the values based, at least in part, on the configuration of the second subset of the binary mirrors.

30. The optical digital signal processing system of claim 27, wherein the digital signal processor comprises a reduced functionality digital signal processor.

31. The optical digital signal processing system of claim 30 further comprising a digital-to-analog converter coupled between the digital signal processor and the light source.

32. The optical digital signal processing system of claim 31, wherein the digital signal processor is operable to digitize the input sequence and wherein the digital-to-analog converter is operable to:

receive the digitized sequence from the digital signal processor;

convert the digitized sequence into an analog current; and communicate the converted analog current to the light source, wherein the current is operable to drive the light source.

33. The optical digital signal processing system of claim 27, wherein the light source comprises a first light source positioned horizontally in relation to a first column of the binary mirrors and the optical digital signal processing system further comprises:

a second light source positioned horizontally in relation to a second column of the binary mirrors;

a first lens operable to collimate light from the first light source such that the first column of mirrors is illuminated and further operable to collimate light from the second light source such that the second column of mirrors is illuminated; and a second lens operable to image light from the first and second light sources horizontally.

34. The optical digital signal processing system of claim 33, wherein the plurality of detectors comprises a first detector positioned vertically in relation to a first row of the binary mirrors and a second detector positioned vertically in relation to a second row of the binary mirrors and the optical digital signal processing system further comprises:

a third lens operable to collimate light from the first row of binary mirrors such that the first detector is illuminated and to collimate light from the second row of binary mirrors such that the second detector is illuminated; and a fourth lens operable to image light from the first and second row of mirrors vertically.

35. The optical digital signal processing system of claim 27, wherein the light source comprises a vertical cavity surface emitting laser diode.

36. The optical digital signal processing system of claim 27, wherein the digital signal processor comprises a first digital signal processor and the optical digital signal processing system further comprises:
   an analog-to-digital converter coupled to the detector array; and
   a second digital signal processor coupled to the analog-to-digital converter.

37. The optical digital signal processing system of claim 27, wherein the digital micromirror device comprises an array of 768×1024 binary mirrors.

38. The optical digital signal processing system of claim 27, wherein the subset of the binary mirrors are optically linked to a substantially similar number of detectors.

39. The optical digital signal processing system of claim 27, wherein the digital micromirror device further comprises a perimeter of guard pixels.

40. The optical digital signal processing system of claim 27, further comprising a beamsplitter operable to receive light from the light source and direct the light to the digital micromirror device and further operable to receive the illumination from the digital micromirror device and direct the illumination to the detector array.

41. A method for optical digital signal processing, comprising:
   configuring a plurality of binary pixels to allow a subset of the binary pixels to represent a range of values;
   receiving light from a light source at the plurality of binary pixels;
   altering the intensity of the light to represent one of the values based, at least in part, on the configuration of the subset of the binary pixels; and
   transmitting the altered light from the plurality of binary pixels to a detector array.

* * * * *